United States Patent [19]

Candle

[11] Patent Number: 4,680,071
[45] Date of Patent: Jul. 14, 1987

[54] METHOD FOR MAKING RUBBER ARTICLES

[75] Inventor: Richard D. Candle, Akron, Ohio

[73] Assignee: The Goodyear Tire & Rubber Company, Akron, Ohio

[21] Appl. No.: 635,377

[22] Filed: Jul. 27, 1984

[51] Int. Cl.⁴ ............................................. B29C 53/36
[52] U.S. Cl. ...................... 156/218; 156/157; 156/203; 156/307.2; 264/347
[58] Field of Search ............... 156/218, 213, 200, 217, 156/275.1, 306.9, 137, 307.1, 338, 110, 1, 157; 264/347, 236, 545, 552; 428/57, 58; 425/363; 219/243

[56] References Cited

U.S. PATENT DOCUMENTS

| | | | |
|---|---|---|---|
| 1,763,106 | 6/1930 | Snyder | 156/218 X |
| 2,142,971 | 1/1939 | Bierer | 264/347 |
| 2,184,630 | 12/1939 | Alexander | 219/243 X |
| 2,424,315 | 7/1947 | Hyatt et al. | 156/218 X |
| 2,529,830 | 11/1950 | Bierer | 219/243 X |
| 2,612,910 | 10/1952 | Krupp | 156/203 X |
| 2,992,957 | 7/1961 | Maxey | 156/218 |
| 3,540,959 | 11/1970 | Connor | 156/218 X |

FOREIGN PATENT DOCUMENTS 0548458 10/1942 United Kingdom ............... 156/218

*Primary Examiner*—Donald E. Czaja
*Assistant Examiner*—Ramon R. Hoch
*Attorney, Agent, or Firm*—R. D. Thompson

[57] ABSTRACT

Indefinite length tubular and sheeting products can be fabricated using either a continuous or step-wise method which uses a two-stage curing sequence. In the first curing stage, the center portion of a thermosetting web is fully cured leaving the lateral edges of the web in an uncured state. The uncured lateral edges are then spliced, either directly to one another, or spliced with a similar web having uncured edges to form either a flat sheet or a tubular preform having longitudinal uncured spliced seams. In the second curing stage, these uncured longitudinal splices are fully cured to form either tubular articles or flat sheeting having completely uniform physical properties throughout.

22 Claims, 8 Drawing Figures

METHOD FOR MAKING RUBBER ARTICLES

BACKGROUND OF THE INVENTION

This invention relates to a method and apparatus for the manufacture of sheeting and large diameter flexible tubular products. It is advantageously adaptable for the continuous production of indefinite length hose and sheet products.

BACKGROUND ART

Methods for manufacturing very large diameter tubular products from thermosetting rubber, both reinforced and nonreinforced, are well known but suffer from limitations owing to the nature of the methods employed for their manufacture. One known method for making large diameter hose is the process where the required number of plies are built up on a large diameter mandrel having an outside diameter equal to the desired inside diameter of the finished tubular product. The problems deriving from this method come from the limitation on the size and weight of the mandrel which may be employed. As the diameter and length of the mandrel increase, so does the mandrel weight, making the building process more difficult, and eventually rendering it impractical. In addition, the length of such large diameter mandrels is limited by the method for curing the hose product. Autoclaves useful for thermosetting rubbers are typically a maximum of 60 to 80 feet long. It is known to employ long, hollow enclosures as autoclaves: however, even that configuration suffers from the limitation of building space to house such a long autoclave. Further, heat distribution over such a long pressure vessel is a practical and unavoidable thermodynamics problem. Thus, hose made by the methods employing mandrels have a necessary limitation on length of the tubular product which may be produced.

If a large diameter tubular product having inside diameters in excess of 3 feet are to be made, another known method involves the longitudinal splicing of cured rubber sheet into a tubular form. This method requires splicing adhesives be used to secure the splice and to obtain suitable strength in the spliced section of the tubular product. In order to obtain spliced strengths nearly equal to the physical properties of the cured rubber sheet being employed, it is necessary to employ curable cements which must be heat and pressure cured in much the same way as the thermosetting elastomer or rubber utilized in the tubular product itself. Problems of incompatibility of the splice cements with the cured sheet, and the criticality of careful cleaning and priming of the cured splice area lead frequently to inadequate and/or inconsistent splice bond strengths. The overlap splices made using this method have objectionable appearance and potential functional problems due to the high profile of the double thickness splice. In water and food hose products, this irregular splice can collect bacteria and contaminants on the interior of the hose. On the exterior, the splice may be snagged during normal use causing a rip or puncture. In addition, this method is very labor intensive and is extremely slow and uneconomical.

Another method for forming tubular products is by using uncured sheets of thermosetting materials which are lap spliced with a suitable means for preventing sticking between the interior surfaces of the tubular product which are then placed in a curing apparatus to produce a product formed in a single curing step. After cure, these products assume a permanent form which is not tubular in shape, but rather is a flattened tube. At the folded edges of the flattened tube the strength properties are poor compared to the rest of the structure leading to weak spots and failure in service at that place in the flattened tube where the walls are doubled over one another.

SUMMARY OF THE INVENTION

One aspect of the present invention is to provide a method for manufacturing large diameter thermosetting tubular articles comprising the steps of: plying up a plurality of thermosetting elastomeric plies to form an uncured thermosetting web; contacting a central portion of the uncured thermosetting web in compressive engagement with a large diameter rotating heated drum for a time sufficient to cure the central portion of the thermosetting web leaving an uncured marginal portion at each edge of the web; forming a longitudinal splice by overlapping said uncured marginal portions at each edge of the web; and contacting the longitudinal splice in compressive engagement with a second large diameter rotating heated drum for a time sufficient to cure the overlapped uncured marginal portions forming the longitudinal splice to form a fully cured large diameter tubular article.

Another aspect of the present invention is to provide a method as above wherein additional center cured webs are provided having uncured lateral edge portions and the uncured edge portions of each of the webs are overlapped with the uncured edge portion of another web to form a splice, and the splice is then cured.

Yet another aspect of the present invention is to provide a method of making indefinite length thermosetting sheeting, said sheeting having at least one thermosetting overlapped splice extending the full longitudinal length of the sheeting, said method comprising the steps of: providing two uncured thermosetting webs, each web having a plurality of thermosetting elastomeric layers curing a central portion of each said thermosetting webs to form a center cured web having at least one uncured edge portion and a cured center portion; providing a second thermosetting web having an uncured marginal portion abutting the edge of said second thermosetting web; overlapping the uncured edge portion of one of the center cured webs, first uncured thermosetting web with the uncured edge portion of another thermosetting web to form an overlapped splice extending the full length of the webs; curing the overlapped splice by compressively contacting said splice with a means for curing the thermosetting webs for a time sufficient to effect full cure of said splice to form a fully cured thermosetting sheeting.

Still another aspect of the present invention is an apparatus for continuously forming a tubular article from a flat web of uncured thermosetting elastomeric material comprising, in sequence such that said web moves continuously through said apparatus, a first curing unit: a means for forming a longitudinally spliced tubular article from the flat web; and a second curing unit, said first curing unit and said second curing unit including a large diameter heated rotating drum, a means for aligning and compressively engaging a thermosetting web into intimate engagement with the drum over a major portion of the outer peripheral surface of said drum.

It is an advantage of an aspect of this invention to be able to produce very large diameter flexible tubular products which may be made in indefinite lengths. It is a further advantage to provide a tubular or sheet product which exhibits uniform physical properties throughout the circumference or width of the product with no decrease in strength in the spliced area. Yet another advantage of an aspect of the invention is the providing of a continuous method for producing indefinite length, very wide tubular or sheet products of consistent and uniform strength and appearance.

DETAILED DESCRIPTION OF THE INVENTION

This invention relates to a unique, two-stage curing method for forming either tubular products or sheeting products which are of indefinite length. Both the tubular article and the wide sheeting article can be fabricated in either a continuous or a step-wise process. Means for curing which are suitable for the preferred continuous process include a class of rotary drum, continuous vulcanizing machines which are commonly known as rotocures, which will be later described in FIG. 4. Also, radiation or electron beam type curing units may be utilized to continuously cure the thermosetting webs. Dual belt systems where belts are heated and tensioned to supply the heat and pressure for curing may also be used. For non-continuous or step-wise application of this method, all of the foregoing curing means may be used as well as the common belt or platen presses used conventionally to make conveyor belts and flat sheeting.

Figure 1:
FIG. 1 is a transverse cross sectional view of thermosetting webs of this invention during the first and second curing stages of making tubular articles.
Figure 1A:
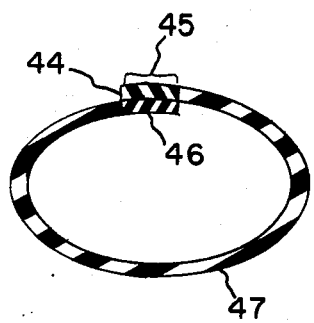
Figure 1B:
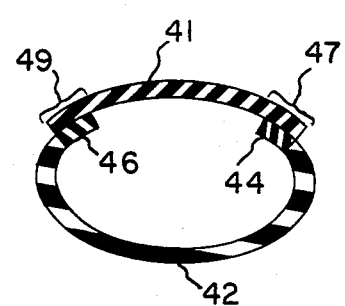

FIGS. 1, 1A, and 1B show the form of the thermosetting webs during the two curing stages of this method. In the first curing stage of the method, an uncured, indefinite length, thermosetting web 40 made up of one or more layers of thermosetting elastomeric material, with or without reinforcement layers, is provided and fed to the first stage curing means for the purpose of fully curing a central portion 42 of the thermosetting web while leaving the lateral or marginal edges 44 and 46 of the web uncured, as shown in FIG. 1. At the end of this first stage, the method diverges depending upon whether a tubular type product is desired to be formed or a sheet type product is being made, and whether one or more thermosetting webs are to be utilized. If a tubular product with a single web is being formed, the uncured lateral edge portions 44 and 46 of the web 40 are brought together to form an overlap splice 45 of uncured elastomeric material, as shown in FIG. 1A. The uncured elastomeric splice 45 running longitudinally of the web moves through the second curing stage where the longitudinal splice is fed to the curing means to effect full cure on the longitudinal splice area and thus form a fully cured tubular article 47 upon the exit from the second stage curing step. An alternative embodiment of this tubular forming method is shown in FIG 1B. A second uncured thermosetting web 41 is provided and interposed between the uncured lateral edges 44 and 46 of the first thermosetting web 40. Two longitudinal overlap splices 47 and 49 are made at the interface between the second uncured thermosetting web 41 and the uncured lateral edges 44 and 46 of the first web. The second thermosetting web may have a cured center portion, in which instance only the longitudinal splice lines are cured in the second stage cure. If the second thermosetting web is uncured across its full width, then the second stage curing means must be capable of imparting a cure to the splices as well as the to uncured interposed second web 41.

Figure 2:
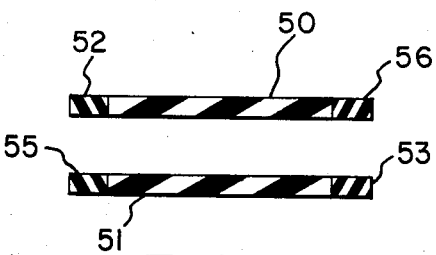
FIG. 2 is a cross sectional view of thermosetting webs of this invention during the first and second curing stages.
Figure 2A:
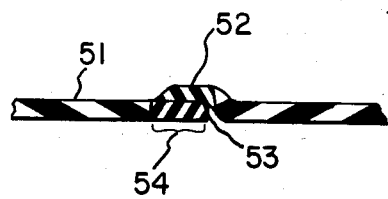
Figure 2B:
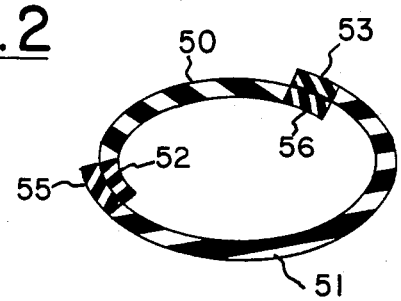

FIGS. 2, 2A and 2B show the form of the thermosetting webs during the two curing stages of this method when an indefinite length flexible thermosetting sheeting is the desired article to be manufactured. A first thermosetting web 50 is cured leaving at least one uncured lateral edge 52. A second thermosetting web 51 is provided which has at least one uncured lateral edge 53. This second thermosetting web 51 is overlapped at its uncured edge 53 with the uncured edge 52 of the first thermosetting web 50 in order to form an overlapped, longitudinal splice 54 between the webs, as shown in FIG. 2A. This splice 54 is then cured using a second curing step which supplies sufficient heat and pressure to the overlapped, longitudinal splice 54 to effect full cure, thus forming a sheet having the combined width of the first and second thermosetting webs less the width of the overlapped edges. Sheeting having greater width may be produced by providing additional webs with uncured edges for attachment to the other uncured lateral edges 55 and 56 and repeating the splicing and curing steps. This process of providing additional thermosetting webs having uncured lateral edges may be continued until a final product having the desired width is obtained. Of course, the second thermosetting web may optionally be uncured across its full width, and it is only necessary in the second curing step that the means for curing be of sufficient width to fully cure both the longitudinal splice area and the uncured width of the second thermosetting web.

The tubular article shown in FIG. 2B illustrates a double overlap splicing method using two center cured webs 50 and 51 and overlapping the uncured edges 52 and 53, and 55 and 56 to form uncured longitudinal splices which are subsequently cured.

Figure 3:
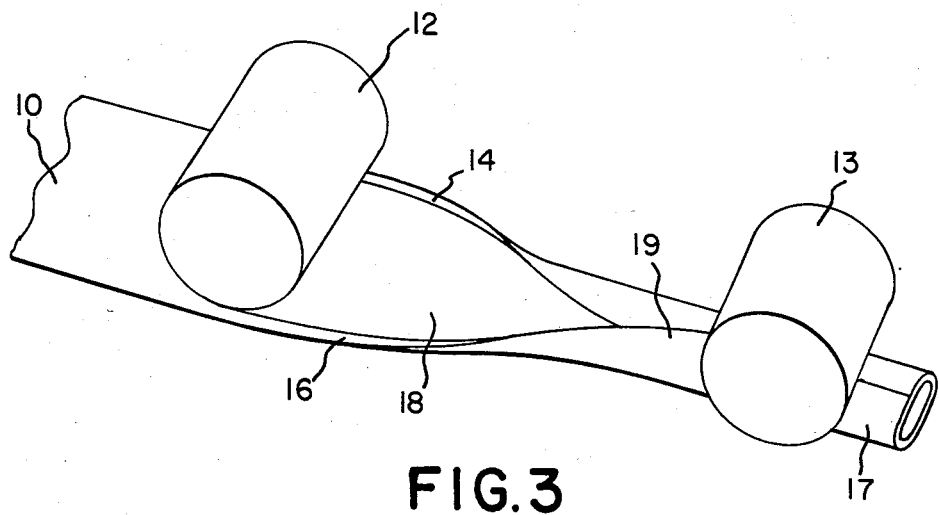
FIG. 3 is a schematic of the tube building method of the invention.

FIG. 3 is a simplified schematic representation of the method of continuous manufacturing tubular products of this invention. An uncured, thermosetting web 10 is continuously fed into compressive contact with a first means for curing, illustrated as a curing drum 12. The width of the uncured thermosetting web 10 is greater than the width of the heated surface of the curing means which provides for uncured marginal edge portions 14 and 16 upon the exit of the web 10 from the first curing drum 12. The center cured portion 18 has a width equal to the width of the curing drum 12. The curing drum 12 is heated to sufficiently high temperature to cure the center portion 18 during compressive contact of the uncured thermosetting web 10 with the drum circumference. The uncured edge portions 14 and 16 are then aligned and positioned to overlap to form a longitudinal splice 19 prior to the contact with a second curing drum 13. Longitudinal, as used herein, always refers to a direction parallel to the axis running the length of the indefinitely long web 10. The width of the second curing drum 13 needs to be at least equal to the width of the splice 19 which is equal in width to the uncured edge portions 14 and 16, minus the splice overlap. The splice 19 is placed in compressive contact with the curing drum 13 which is maintained at sufficiently high temperature to cure the previously uncured portion 14 and 16 to form a fully cured tubular product 17 upon the exit from the second curing drum 13.

The uncured thermosetting web 10 may be constituted of one or more thermosetting elastomeric layers. The term "elastomeric layers" may be unreinforced or reinforced thermosetting polymers. Preferably, one or more of the elastomeric layers is composed of reinforcing materials, such as square or tubular woven fabrics, frictioned cord-type material, or other reinforcements known to be useful for reinforced rubberized fabric, belting and hose products with circumferentially discontinuous reinforcement. For a tubular hose-type product, the innermost and outermost layer will preferably be elastomeric tube and cover materials. The thermosetting elastomers which may be used are any of the conventionally known rubber polymers or thermosetting urethane polymers which are elastomeric and flexible after they undergo the heat and pressure of a curing process. Representative thermosetting elastomers include, but are not limited to, natural rubber, styrene butadiene rubber, acrylonitrile butadiene rubber, ethylene propylene rubber, ethylene propylene diene terpolymer, polychloroprene, butyl rubbers, polyisoprene, polybutadiene, curable chlorinated polyethylenes, epichlorohydrin, polysulfide.

Figure 4:
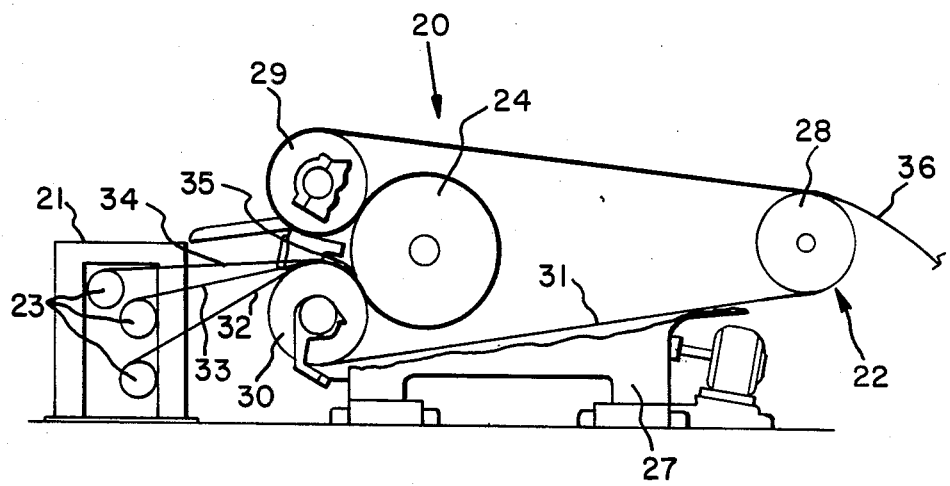
FIG. 4 is a side view of one stage of the tube forming and curing apparatus of this invention.

Referring now to FIG. 4, there is illustrated a preferred embodiment of the curing apparatus 20 of this invention. Curing apparatus 20 is understood as the functional equivalent of the curing drums 12 and 13 of FIG. 3, and represents a most preferred means for curing in this invention. In the practice of the method of this invention, a fully continuous production line for indefinite length thermosetting tubular articles may be set up by placing two curing apparatus 20 in line to allow the first curing apparatus to cure the center portion of the web and then longitudinally folding over the uncured edges to continuously form an overlapping longitudinal splice prior to advancing the spliced web to the secondary curing apparatus for the continuous curing of the spliced web to form the finished and fully cured indefinite length thermosetting tubular product. The curing apparatus 20 has a let-off end 21 and take-up end 22. A plurality of dispensing reels 23 are positioned at the let-off end 21 of the apparatus 20. These reels 23 are adapted to dispense the plurality of layers which form the uncured thermosetting web 35 which is continuously entrained through the remainder of the elements of the apparatus. A first very large diameter, heated, rotatable drum 24 is journaled into a support frame 27. This first drum 24 is the major functional component in the curing apparatus 20. A second rotatable large diameter drum 28 is journaled in frame 27 in a position downstream from the drum 24 or alternatively described as toward the take-up end 22 of the apparatus. Positioning rollers 29, 30 are journaled in frame 27 tangentially to the first drum 24, and each positioning roller has an axis of rotation parallel to the axis of rotation of drum 24. An endless transport belt 31 is entrained around a major portion of the circumference of drum 24 and around positioning rollers 29 and 30 and around the second large diameter drum 28 to form an endless path around the rollers such that a maximum circumference of the heated rotatable drum 24 is covered by the transport belt 31. Some or all of the rollers 29 and 30 and drums 24 and 28 may be adjustably mounted in suitable bearings to enable modifications of the tension and position of the transport belt in the apparatus 20. One or more of the drums 24 and 28 are driven by a suitable means such as the motor.

The method of the invention may be best illustrated with reference to FIG. 4 where a plurality of layers 32, 33 and 34 are plied up to form an uncured thermosetting web 35 which is fed onto the transport belt 31 and into compressive contact with the curing drum 24. The compressive contact is of course supplied by the pressure of the tensioned transport belt 31 against the heated peripheral surface of the drum 24. The residence time of the uncured thermosetting web in contact with the surface of the heated drum is of sufficient duration to assure curing of the thermosetting elastomeric portion of the web prior to its exit from the compressive contact with the heated drum 24. In this first stage curing step, only the central portion of the web 35 is in contact with the outer peripheral surface of the heated drum. The web width is greater than the width of the heated drum 24 which results in the outer edges of the web remaining in an uncured state after the exit from heated drum 24. The web having a cured center portion and uncured outer edges proceeds through the first stage curing apparatus as illustrated in FIG. 4 on the transport belt 31 until the point where the transport belt 31 continues around the circumference of the second large drum 28 where the web is separated from the transport belt for subsequent processing in the second stage curing step.

The center cured web 36 exits the first stage curing apparatus 20 and is subsequently manipulated by a means for effecting a longitudinal overlap splice wherein the uncured edges are overlapped in longitudinal seam forming relation to form a spliced, flattened, tubular web which is schematically illustrated in FIG. 3. The longitudinally spliced web is then fed to a second stage curing apparatus which may be, in a preferred embodiment, similar in all respects to the apparatus of FIG. 4. The spliced web would be fed to the second stage curing apparatus in the same way that the uncured web 35 is illustrated as being fed to the transport belt 31 in FIG. 4. The uncured marginal edges which have been formed previously into a longitudinal seam are fed into direct contact with a heated rotating curing roll for a time sufficient to effect cure of the marginal portions upon exit from the second stage curing drum. The elastomeric component of the spliced web has been fully thermoset to form a fully cured tubular product 17 (FIG. 3). The tubular product 17 may be of indefinite length and may be of any suitable diameter including very large diameter hose products of from 1 to greater than 3 meters.

The means for forming the longitudinal splice is preferably one which will enable continuous forming of the longitudinal splice. One simple means for forming the splice is accomplished by feeding the web having the cured center portion and the uncured marginal edges into a gradually narrowing conically configured tube. As the web progresses through the narrowing tube the uncured marginal edges move up and around the interior surface of the conical tube until they form an overlap splice. An additional means for forming the splice involves a longitudinally extending series of troughing rollers or idlers which are set in a substantially semi-circular to nearly circular cross sectional configuration.

The cross section of the troughing idler array becomes progressively smaller in order to bring the flat edges upward and inward into an overlapped splice position. A simpler method also utilizing rollers or idlers places them in a roughly rectangular array which becomes narrower and narrower as the web progresses toward the second curing stage, thus forcing the edges to move up and over, eventually flattening the edges one on top of the other to form a splice.

A reinforced tubular rubber structure having a circumference slightly greater than 5 meters was produced using the method of this invention with a pair of curing means called rotocures, which are similar in all respects to the apparatus illustrated in FIG. 4. Two thermosetting elastomeric webs 1.6 mm in thickness and 2.6 meters in width were produced by interposing a layer of adhesion treated woven fabric between an inner and outer layer of thermosetting elastomer made from a sulfur curable, carbon black reinforced, acrylonitrile-butadiene rubber/ polyvinylchloride (NBR/PVC) blend. The two thermosetting webs were sequentially fed to a 1.2 meter diameter drum, the surface of which was maintained at 150° C. The drum width was 2.2 meters; thus, during engagement with the drum, approximately 0.2 meters of the thermosetting web extended outward of the heated zone of the heated rotating drum. Each web was moved through the curing apparatus and maintained in compressive contact with the heated drum outer surface by a tensioned transport belt. The thermosetting webs were continuously cured by contacting the heated drum during its rotation for a residence time of approximately 20 minutes. The center section of the thermosetting web achieved full cure during the residence time, while the lateral edges remained in an uncured state. Upon exit from the first stage curing apparatus, the two center cured webs were spliced together by overlapping the uncured lateral edge portions similar to webs 50 and 51 shown in the lower right hand portion of FIG. 2. The spliced tubular preform was then fed to another curing apparatus for contact with the 150° rotating drum in an orientation such that the uncured splice areas were held in compressive contact with the exterior heated surface of the drum by the transport belt in order to fully cure the splice area. Upon exit from the second stage curing apparatus, a 5 meter tubular structure or hose having a wall thickness of 1.6 mm, except in the splice area where it was slightly thicker.

The overlapped splices assumed a very satisfactory appearance during the second stage cure due to the flow of the uncured rubber to form a smooth splice area with no raised edges. Functionally, this smooth splice area is important to eliminate the possibility of snags and ripping during use of the tube. The portion of the webs which had been cured in the first stage cure formed an excellent, resilient surface for the inside splice surface to be compressed against. The previously cured portions which were subjected to the additional heat of the second stage cure suffered no loss of physical properties.

COMMERCIAL APPLICABILITY

The method of this invention forms a tubular product which has uniform strength and physical properties throughout its circumference. This uniformity of strength and physical properties throughout the circumference is in marked contrast to tubular products which are made from uncured thermosetting webs which are spliced and cured in a single step creating a folded edge and a flattened tube rather than a tubular shape. That flattened edge has significantly lower strength than the rest of the hose structure. The hose of this method does not suffer from that problem. This method further has the significant advantage of being capable of producing large diameter tubular products in indefinite, indeed infinite, lengths. This capability is heretofore unknown in other methods for making large diameter thermosetting tubular products.

The very large diameter long length tubular products produced by this invention may be used as large pillow tanks or flexible containment vessels for water, fuel, etc. Large bore hose such as underwater fuel transport or discharge hose. The flat sheeting material can be used for extra-wide lightweight conveyor belting, roofing or pond linings.

While certain representative embodiments have been shown for the purpose of illustrating the invention, it will be apparent to those skilled in the art that various changes and modifications may be made therein without departing from the scope of the invention. Such modifications are to be considered as included in the following claims unless these claims by their language expressly state otherwise.

I claim:
1. A method for manufacturing an indefinite length thermosetting tubular article comprising the steps of:
   (a) plying up a plurality of thermosetting elastomeric layers to form an uncured thermosetting web having a central portion and lateral edge portions;
   (b) curing said central portion of the width of the uncured thermosetting web in compressive engagement with a means for curing for a time sufficient to form a center cured web having a cured central portion, and a first uncured lateral edge portion and a second uncured lateral edge portion;
   (c) overlapping said first uncured lateral edge and second uncured lateral edge portions to form a longitudinal overlap splice; and
   (d) curing the longitudinal overlap splice in compressive engagement with a means for curing for a time sufficient to fully cure the longitudinal splice to form a fully cured tubular web.

2. The method as claimed in claim 1 further comprising the additional step, after the first curing step, of providing a second uncured thermosetting web by plying up a plurality of thermosetting elastomeric layers, said forming step comprising interposing said second uncured thermosetting web between said first uncured edge and said second uncured edge and overlapping the first and second uncured edges over the second uncured thermosetting web to form a longitudinal overlap splice.

3. A method as set forth in claim 1 wherein at least one of said plurality of thermosetting layers is a reinforcing fabric.

4. A method as set forth in claim 1 wherein said overlapping step comprises manipulating the uncured edges with a series of rollers disposed in a gradually narrowing troughing formation to guide the edges progressively upward and inward to form a longitudinal splice.

5. The method as set forth in claim 1 wherein said means for curing is selected from the group of curing methods consisting of: radiation, electron beam, heated rotating drum, and dual heated belt.

6. A method as set forth in claim 1 wherein said means for curing is a large diameter rotating heated drum.

7. The method as set forth in claim 1 wherein all the steps are conducted continuously with the thermosetting web passing directly from one step to the next step.

8. The method as set forth in claim 1 wherein said means for curing is a platen press and wherein said steps of the method are performed on longitudinally sequential portions of said uncured thermosetting web and wherein said method further comprises the steps of: advancing said thermosetting web to bring the next longitudinal sequential portion into compressive engagement with the platen press and repeating said curing; overlapping: curing and advancing steps until the tubular article is fully cured over its full length.

9. A method of manufacturing an indefinite length thermosetting tubular article comprising the steps of:
(a) providing a plurality of uncured thermosetting webs, each having a central portion and lateral edge portions:
(b) curing each of said central portions in compressive engagement with a means for curing for a time sufficient to fully cure each central portion to form a center cured web having uncured lateral edge portions:
(c) overlapping the uncured lateral edge portion of one of the plurality of center cured webs with the uncured lateral edge portion of another of the plurality of center cured webs to form a longitudinal splice;
(d) curing the longitudinal splice by compressively engaging said splice with a means for curing the splice for a time sufficient to fully cure the longitudinal splices to form a fully cured large diameter tubular article.

10. A method as set forth in claim 9 wherein said uncured thermosetting webs are fabric reinforced.

11. A method as set forth in claim 9 wherein said overlapping step comprises manipulating the uncured edges with a series of rollers disposed in a gradually narrowing troughing formation to guide the edges progressively upward and inward to form a longitudinal splice.

12. The method as set forth in claim 9 wherein said means for curing is selected from the group of curing methods consisting of: radiation, electron beam, heated rotating drum, and dual heated belt.

13. A method as set forth in claim 9 wherein said means for curing is a large diameter rotating heated drum.

14. The method as set forth in claim 9 further comprising repeating the sequntial steps of overlapping and curing until all uncured lateral edge portions of the thermosetting webs are cured, thus forming a fully cured tubular article.

15. The method as set forth in claim 9 further comprising repeating said overlapping step until all uncured edge protions are formed into a plurality of longitudinal splices, said curing step comprising curing the plurality of longitudinal splices by compressively engaging said splices with a means for curing for a time sufficient to form a fully cured tubular article.

16. A method of making indefinite length thermosetting sheeting, said sheeting having at least one thermosetting overlapped splice extending the full longitudinal length of the sheeting, said method comprising the steps of:
(a) providing a first uncured thermosetting web having a plurality of thermosetting elastomer layer;
(b) curing a central portion of said first thermosetting web to form a first center cured web having at least one uncured edge portion and a cured center portion;
(c) providing a second thermosetting web having an uncured marginal edge portion;
(d) overlapping the uncured edge portion of said first center cured web with said uncured marginal edge portion of said second thermosetting web to form an overlapped splice extending the full length of the webs;
(e) curing the overlapped splice by compressively contacting said splice with a means for curing the thermosetting webs for a time sufficient to effect full cure of said splice to form a full cured thermosetting sheeting.

17. A method as set forth in claim 16 wherein at least one of said plurality of thermosetting layers is a reinforcing fabric.

18. A method as set forth in claim 16 wherein said overlapping step comprises manipulating the uncured edges with a series of rollers disposed in a gradually narrowing troughing formation to guide the edges progressively upward and inward to form a longitudinal splice.

19. The method as set forth in claim 16 wherein said means for curing is selected from the group of curing methods consisting of: radiation, electron beam, heated rotating drum, and dual heated belt.

20. A method as set forth in claim 16 wherein said means for curing is a large diameter rotating heated drum.

21. A method according to claim 16 wherein said second thermosetting web is uncured across its full width.

22. A method according to claim 16 wherein said second thermosetting web includes a cured central portion and uncured marginal edge portions flanking said cured central portion.

* * * * *